United States Patent
Slater et al.

(10) Patent No.: US 10,908,831 B2
(45) Date of Patent: Feb. 2, 2021

(54) SELECTING CLOUD STORAGE

(71) Applicant: Hewlett Packard Enterprise Development LP, Houston, TX (US)

(72) Inventors: Alastair Slater, Chepstow (GB); Richard Phillip Mayo, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/171,019

(22) Filed: Oct. 25, 2018

(65) Prior Publication Data
US 2020/0133544 A1 Apr. 30, 2020

(51) Int. Cl.
*G06F 3/06* (2006.01)

(52) U.S. Cl.
CPC ........... *G06F 3/0641* (2013.01); *G06F 3/067* (2013.01); *G06F 3/0608* (2013.01)

(58) Field of Classification Search
CPC .............................................. G06F 2003/0697
See application file for complete search history.

(56) References Cited

U.S. PATENT DOCUMENTS

| | | | |
|---|---|---|---|
| 7,504,969 B2 * | 3/2009 | Patterson | G06F 11/1451 341/50 |
| 8,463,981 B2 * | 6/2013 | Mori | G06F 3/0641 711/162 |
| 8,762,480 B2 | 6/2014 | Park et al. | |
| 9,325,791 B1 * | 4/2016 | Blahaerath | H04L 67/1097 |
| 2012/0233417 A1 * | 9/2012 | Kalach | G06F 3/0641 711/162 |
| 2014/0136571 A1 | 5/2014 | Bonvin et al. | |

OTHER PUBLICATIONS

Matt, J., "Dynamic Optimization of Data Object Placement in the Cloud," Apr. 21, 2017, http://www.infosys.tuwien.ac.at/staff/sschulte/paper/Matt_Master.pdf.

Zhang, Q. et al., "CHARM: A Cost-efficient Multi-cloud Data Hosting Scheme with High Availability," 2015, pp. 1-14, http://www.projectsgoal.com/download_projects/cloud-computing/cloud-computing-projects-GCC00105.pdf.

Mansouri, Y. et al., "Brokering Algorithms for Optimizing the Availability and Cost of Cloud Storage Services," 2013, pp. 581-589, http://gridbus.cs.mu.oz.au/papers/BrokeringCloudStorage-CloudCom2013.pdf.

Papaioannou, T. G. et al., "Scalia: An Adaptive Scheme for Efficient Multi-Cloud Storage," Nov. 10, 2012, 10 pages, https://infoscience.epfl.ch/record/181424/files/SC2012_cameraready.pdf.

Yao, W. et al., "A Selection Algorithm of Service Providers for Optimized Data Placement in Multi-Cloud Storage Environment," 2015, pp. 81-92, https://page-one.live.cf.public.springer.com/pdf/preview/10.1007/978-3-662-46248-5_11 .

* cited by examiner

Primary Examiner — Henry Tsai
Assistant Examiner — Juanito Borromeo
(74) Attorney, Agent, or Firm — Hewlett Packard Enterprise Patent Department

(57) ABSTRACT

Examples include selection of a remote object storage system for a deduplication data item. Some examples may include determination of an expected usage frequency for the deduplication data item, selection of a remote object cloud storage system based on the expected usage frequency for the data item, and provision of the deduplication data item to the selected remote object storage system for storage as an object in the selected remote object storage system.

13 Claims, 3 Drawing Sheets

SELECTING CLOUD STORAGE

BACKGROUND

A computer system may store data in local storage of the computer system. In some examples, the data may also be stored in a remote data backup system that is in communication with the computer system. In such examples, the data may be retrieved from the data backup system when the data is lost, corrupted, or otherwise becomes inaccessible at the local storage of the computer system, for example.

BRIEF DESCRIPTION OF THE DRAWINGS

The following detailed description references the drawings, wherein.

DETAILED DESCRIPTION

Figure 1:
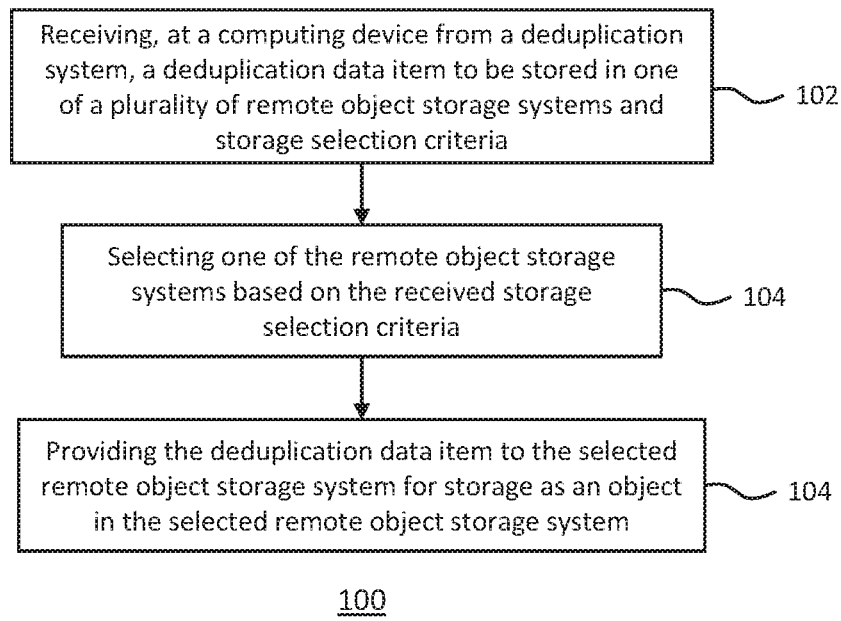
FIG. 1 is a flow chart of an example of a method of selecting a cloud storage location for a data item.

FIG. 1 is a flow chart of an example of a method 100, for example a method of selecting a cloud storage location for a data item. The method comprises, in block 102, receiving, at a computing device from a deduplication system, a deduplication data item to be stored in one of a plurality of remote object storage systems and storage selection criteria. The data item could be, for example, a portion of a deduplicated representation of a collection or stream of data (which may be referred to herein as a "deduplication data item"). In some examples, a deduplication data item may include deduplication metadata or chunk data, as described below. In some examples, receiving the data item may comprise retrieving the data item. In some examples, method 100 may be performed by a computing device, such as a computing device comprising at least one processing resource to execute instructions stored on a machine-readable storage medium to perform method 100.

The method 100 also comprises, in block 104, selecting one of the remote object storage systems based on the received storage selection criteria. In some examples, the storage selection criteria may include one or more of an object name of the data item, a property of storage for the data item, or a property of data in the deduplication data item.

For example, if the storage selection criteria includes an object name of the data item, the object name may be indicative of a type of the data item and thus the type may be used to select the remote object storage system. In some examples, the object name of the data item (which may be for example a name of the object when stored in a remote object storage system) may indicate whether the data item is a data chunk or deduplication metadata. In some examples, this may indicate the expected usage frequency (e.g. frequency of access after storage) of the data item. In some examples, the storage selection criteria may indicate whether the data item is a data chunk or deduplication metadata, and/or may indicate the expected usage frequency. Thus, in some examples, the method 100 may comprise determining an expected access frequency of the deduplication data item from the storage selection criteria, wherein selecting one of the remote object storage systems based on the received storage selection criteria comprises selecting one of the remote storage systems based on the expected access frequency. In some examples, the method 100 may comprise determining the expected usage frequency from a type of the deduplication data item. In some examples, determining the expected usage frequency from a type of the deduplication data item comprises determining the expected usage frequency based on whether the deduplication data item is a data chunk or a deduplication metadata.

In some examples, if the expected usage frequency is relatively high, a particular storage system or subset of storage systems may be selected for storing the data item, whereas if the expected usage frequency is low, then a different particular storage system or subset of storage systems may be chosen. In some examples, the expected access frequency of deduplication metadata may be expected to be relatively high, and the expected access frequency of a data chunk may be expected to be relatively low.

In some examples, the storage selection criteria may indicate a property of storage for the data item. For example, the property may indicate the expected or desired access frequency, access latency, bandwidth, or any other access property for accessing the data item that is desired from the storage that is selected for storing the data item.

In some examples, the storage selection criteria may indicate a property of data in the deduplication data item. This may be used to select a remote object storage system for storing the data item, for example by using the property to determine an expected access frequency or other criteria that may influence the preferred remote object storage system selected for storing the data item. In some examples, a deduplication system, such as for example the deduplication system from which the data item is received in block 102, may deduplicate data provided for storage (e.g. remotely or locally to the deduplication system) in order to store the data using less space than would be occupied by the full data (i.e., in non-deduplicated form). In examples described herein, a process of deduplication performed by a deduplication system, data storage system or backup system (or other system) on a collection of data (referred to herein as a "stream" of data) may include breaking the stream into portions of data that may in some examples be referred to as "chunks", identifying chunk(s) of the stream that have content identical to the content of another chunk of the stream (or previous streams), storing one (full or compressed) copy of that identical content, and storing references to that one copy of the identical content for chunk(s) of the data stream that include that content. In this manner, a deduplication process may avoid storing "duplicate" copies of chunks of a stream of data, and instead store a single copy of data content that is identified as having duplicates in the stream of data. The system performing the deduplication may in some examples store deduplication metadata including, for each chunk in the data stream, a reference to the stored copy of the content of the chunk. Such metadata may enable reconstruction of the original, full version of the stream of data by the system by traversing the metadata and, for each reference to a stored copy of data, providing the full content of data that the reference points to.

In some examples, a first expected usage frequency may be determined for a first data item type, such as, for example, metadata for a deduplicated representation of stream of data, and a second, different expected usage frequency may be determined for a second data item type, such as for example chunk data (e.g., a collection of data chunk(s)) of the deduplicated representation of the stream of data. In some examples, metadata is expected to be accessed with relatively high frequency, whereas chunks are expected to be accessed at a relatively low frequency (e.g. at a lower frequency than the metadata). Examples of metadata (which may be referred to as "deduplication metadata") and chunks (or "chunk data") are described below.

In some examples, data stored in local storage of a computer system may also be stored in a remote data backup system that is in communication with the computer system. In some examples, the data backup system may deduplicate data provided for backup in order to store the data using less space than would be occupied by the full data (i.e., in non-deduplicated form).

For disaster recovery purposes, it may be desirable to store data and metadata embodying a deduplicated representation of stream of data at a storage location that is remote from the deduplication system (e.g., backup system) that performed the deduplication, so that the deduplicated stream may be restored from the remote storage. Examples described herein may structure and store data chunks and metadata in a remote object storage system (such as a cloud object storage system, comprising one or more cloud storage locations) such that deduplicated streams of data, or portions thereof, may be restored from the remote object storage system by a local deduplication system efficiently after a data loss at the local deduplication system.

Additionally, to efficiently perform deduplication, a deduplication system may create and utilize various types of deduplication metadata for determining whether a given chunk of data has been seen previously in a data stream to be backed up, and thus may be considered a duplicate chunk whose content can be omitted from being stored again. In such examples, this deduplication metadata may be continually updated while processing a data stream, including adding new metadata or mappings for chunks of data and adjusting reference counts for chunks of data, for example.

It may also be desirable to recover this the deduplication metadata in a disaster recovery situation (e.g., after a data loss, when another deduplication system is to be used after a failure of another). However, it may be difficult to store this deduplication metadata in an object storage system, as the ability to update data stored as objects in an object storage system (such as a cloud object storage system) may be limited, as some cloud object storage system(s) do not enable editing an object once stored. For example, an object storage system (e.g., a cloud object storage system) may be implemented such that an object is "immutable" once it is stored, in that the object storage system does not enable editing, appending to, or truncating a stored object. In such examples, an object stored in the object storage system may be considered "immutable".

In some examples, metadata (e.g. data stream metadata, or chunk metadata) may be expected to be accessed at a higher frequency than other data types, such as a data chunk. Therefore, a first remote object storage system or first plurality of remote object storage systems may be selected for storing metadata, whereas a second remote object storage system or second plurality of remote object storage systems may be selected for storing a data chunk. In examples described herein, a remote object storage system or cloud storage "location" may refer to a particular remote object storage system or a plurality of remote object storage systems of a given provider entity or operator. In such examples, different cloud storage locations may refer to different (e.g., physically different) remote object storage systems or respective pluralities of remote object storage systems operated by different provider entities.

In some examples, each object storage system (e.g. each cloud storage location) may be a remote object storage system in that the object storage system is "remote" from a deduplication system (or other system or device) that selects locations for storing data items in the object storage system. In examples described herein, a remote object storage system may not be local to (or locally attached to) the deduplication system, but may instead be accessible to the deduplication system via a computer network such as, for example, a local area network (LAN), a virtual LAN (VLAN), a wireless local area network (WLAN), a virtual private network (VPN), the Internet, or the like, or a combination thereof. In some examples, the remote object storage system may be a "cloud" object storage system that is remote from the deduplication system (and may be referred to herein as a "remote cloud object storage system"). In examples described herein, a remote object storage system (e.g., cloud object storage system) may be implemented by at least one computing device.

In some examples, the method 100 may comprise informing the deduplication system from which the deduplication item is received of which remote object storage system was selected for that data item. In other examples, the deduplication system can determine the location of the data item in any other suitable manner. For example, the location may be stored in a database or catalogue maintained for stored data items, and the database or catalogue or appropriate entry therein may be retrieved by or for the deduplication system (e.g. based on the object name). In some examples, a lookup or filtered lookup may be used, where a query is sent to remote object storage locations to determine if they store the data item. For example, a filtered lookup may involve sending the query to a subset of the remote object storage systems, e.g. based on the object name.

Figure 2:
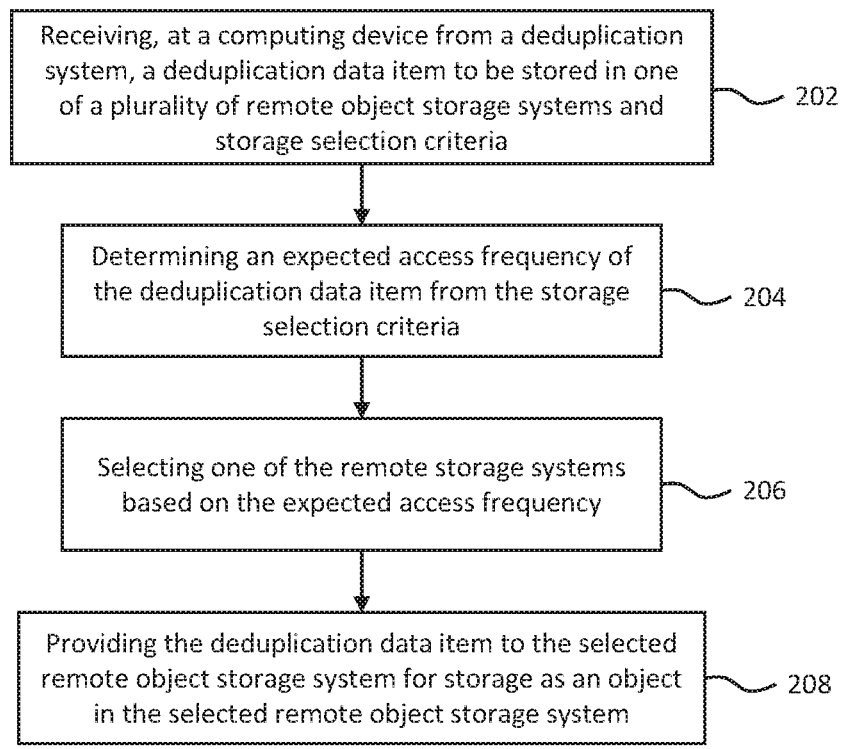
FIG. 2 is a flow chart of an example of a method of selecting a cloud storage location for a data item.

FIG. 2 is a flow chart of an example of a method 200 of selecting a cloud storage location (or remote object storage system, throughout herein) for a data item. The method comprises, in block 202, receiving, at a computing device from a deduplication system, a deduplication data item to be stored in one of a plurality of remote object storage systems and storage selection criteria. In some examples, method 200 may be performed by a computing device, such as for example a computing device comprising at least one processing resource to execute instructions stored on a machine-readable storage medium to perform method 200.

Block 204 of the method 200 comprises determining an expected access frequency of the deduplication data item from the storage selection criteria, and block 206 comprises selecting one of the remote storage systems based on the expected access frequency. Block 208 of the method 200 comprises providing the deduplication data item to the selected remote object storage system for storage as an object in the selected remote object storage system.

In some examples, the method 200 comprises selecting one of the remote object storage systems based on a respective property of each of the remote object storage systems. The selection may therefore be done for example based on the respective properties as well as the storage selection criteria. For example, the property may be one or more of a respective access throughput, access latency, access cost, or storage cost (e.g., of each of the cloud storage locations). The at least one respective property may be used for example to store data items with particular expected usage frequency in appropriate locations. For example, data items with a relatively high expected usage frequency (e.g. deduplication metadata) may be stored in a storage location that has a low access latency, high throughput, and/or low data access cost. On the other hand, data items with a relatively low expected usage frequency (e.g. chunk data) may be stored in a storage location that has a higher access latency, lower throughput, and/or low data storage cost. In some examples, the at least one property of each storage location may be monitored (e.g. continuously or periodically measured). If the at least one property of a storage location is adversely affected, data items may be moved between storage locations. For example, data items with a relatively high expected usage frequency may be moved to storage locations with more beneficial properties (e.g. higher throughput, lower access cost and/or lower latency), and/or data items with a relatively low expected usage frequency may be moved to storage locations with less beneficial properties.

In some examples, the method 200 may comprise determining the expected usage frequency from a type of the data item. The type may be determined from an object name to be used for the data item in a cloud storage system (or remote object storage system). Determining the expected usage frequency from a type of the data item may in some examples comprise determining the expected usage frequency based on whether the data item is chunk data or metadata (e.g., deduplication metadata).

As described above, in some examples, the object name to be used for the data item may be used to determine the expected usage frequency of the data item or the type of the data item. Some examples may comprise determining whether the object name of a data item complies with a regular expression defining the format of object names for chunk data, or whether the object name complies with a regular expression defining the format of object names for deduplication metadata. This may then indicate whether the data item is chunk data or deduplication metadata. The determination may then be used to select a remote object storage system for storing the data item.

In some examples, there may be a lookup table, where the regular expression for a chunk data item is associated with or mapped to one or more properties desired for storage of chunk data, and the regular expression for a deduplication metadata data item is associated with or mapped to one or more properties desired for storage deduplication metadata. Such properties may then be used to select a remote object storage system for the data item that matches the one or more properties or most closely matches the one or more properties. In other examples, the regular expression for an object name for chunk data and deduplication metadata may respectively be associated with or map to a particular remote object storage system. For example, the regular expression for an object name for chunk data could map to a first remote object storage system, and the regular expression for an object name for deduplication metadata could map to a second remote object storage system.

Examples of object name formats will now be described. In examples described herein, each deduplicated representation of a stream of data may include deduplication metadata including stored records that include metadata sufficient to access (e.g., retrieve) chunks representing data of the stream. For example, each record may include or be associated with a virtual container ID and entity ID, indicating a virtual container and an entity object, respectively, that include the chunk represented by the record (where the entity object is logically associated with the virtual container). In a particular example, a record may include a virtual container ID having a value of "211" and thus identify the virtual container assigned ID "211". The record may further include an entity ID indicating a value of "02". In some examples, records of stored chunks may include other information as well.

For example, in some examples, chunks may be compressed for storage in entity objects and, in such examples, the records may include a compression code (indicating a compression methodology utilized) and both a compressed size of the chunk and an uncompressed size of the chunk. In some examples, a data item may include metadata for the deduplicated data (e.g., deduplication metadata), and not any chunk data (either compressed or uncompressed). For example, data items containing chunk data may be stored in remote object storage system(s) in respective objects (e.g., "chunk objects") that do not include deduplication metadata, and deduplication metadata may be stored in remote object storage system(s) in respective objects (e.g., "metadata objects") that do not include chunk data.

In examples described herein, each object stored in a remote object storage system may be assigned an object name by which the data object may be accessed in the remote object storage system (e.g. by deduplication system or other system). In examples described herein, each chunk object (e.g., of chunk data) may be assigned an object name that is based on the virtual container ID for the virtual container it is assigned to (i.e., logically associated with) and an entity ID for the entity within the associated virtual container. In some examples, the object name may include other information, such as an alphanumeric tag with each ID. For example, an entity object name may be constructed to include a "C" (for virtual container ID) followed by the virtual container ID, and include an "E" (for entity ID) followed by the entity ID. For example, an entity object may be assigned an entity ID "00" within virtual container and may be assigned an object name of "C211E00", including the virtual container ID "211" for the virtual container and its entity ID "00". In like manner, an entity object may be assigned an entity ID "01" within virtual container and may be assigned an object name of "C211 E01", another entity object may be assigned an entity ID "02" within virtual container and may be assigned an object name of "C211E02", and another entity object may be assigned an entity ID "03" within virtual container and may be assigned an object name of "C211E03". Although in this example, the object names are constructed with a leading tag "C" before the virtual container ID and a leading tag "E" before the entity ID, in other examples the leading tags may be different or omitted, and other information, demarcation, or the like, may be included in the object names along with the virtual container ID and entity ID. In examples described herein, virtual containers are not objects stored in the remote object storage system, but are instead a logical grouping of entity object(s) that are objects of the remote object storage system. In such examples, virtual containers do not have any object name, though they may be assigned a virtual container ID, as described above.

In examples described herein, each metadata object stored in a remote object storage system may also be assigned an object name by which the object may be accessed in the remote object storage system. In examples described herein, at least some metadata objects may be assigned object names based on the associated backup item ID(s) and data range(s) represented by the metadata objects, respectively. For example, a metadata object uploaded to or stored in a remote object storage system may be assigned a name that includes a backup item ID of an associated backup item that is at least partially represented by metadata of the metadata object, and that includes information identifying a data range of the associated backup item (e.g., the stream of data) that is represented by metadata of the metadata object.

For example, the object name of a metadata object may be constructed to include both the backup item ID associated with the data object and information representing the data range of the associated backup item that the data object represents.

In some examples, the object name may include other information, such as an alphanumeric tag associated with an ID, or the like. For example, an object name for a metadata object may be constructed to include a string "IT" (for "item") followed by the respective backup item ID, and include beginning and ending offsets defining a data range and separated by any suitable demarcation.

For example, a metadata object may be assigned an object name having a value of "IT202_1000_2000", which includes backup item ID "202" identifying a backup item associated with backup item ID "202", and which includes information identifying that the metadata object represents a data range of the backup item having ID "202" that begins at offset "1000" and ends at offset "2000" of that backup item. In such examples, the tag "IT" may identify "202" as a backup item ID, and the offsets in the object name may be demarcated by underscore characters. In other examples, other suitable tags and demarcation formats may be used or omitted. Also in some examples, another metadata object may be assigned an object name of "IT202_0000_1000", which includes backup item ID "202" identifying the backup item, and which includes information identifying that the metadata object represents a data range of the backup item (having ID "202") that begins at offset "0000" and ends at offset "1000" of the backup item. Also in some examples, another metadata object may be assigned an object name of "IT201_0000_1000", which includes backup item ID "201" identifying backup item, and which includes information identifying that the metadata object represents a data range of a backup item having ID "201" and that begins at offset "0000" and ends at offset "1000" of the backup item. Although in these examples, the metadata object names are constructed with a leading tag "IT" before the backup item ID and underscore demarcations, in other examples the leading tag may be different or omitted, and other information, demarcations, or the like, may be included or used in the metadata object names along with the backup item ID and data range information. Also, in other examples, the data range may be indicated in the metadata object names in another suitable manner (e.g., indicating that the metadata object represents data 0-1 GB of data of the backup item, etc.). Although example numbers used herein for identifiers, offsets, and the like, are provided for illustrative and explanatory purposes, actual numbers used in implementations of examples described herein may be different in length, values, format, etc., while being used in manner consistent with examples described herein.

Thus, for example, a data item to be stored in a remote object storage system (such as a cloud storage system) may be stored to the remote object storage system as an object and assigned an object name according to a particular format. The object name may be examined to determine information relating to the data item, such as for example the type of the data item and/or its expected usage frequency, and this information may be used in some examples to select a storage location (e.g., remote object storage system) for the data item.

Figure 3:
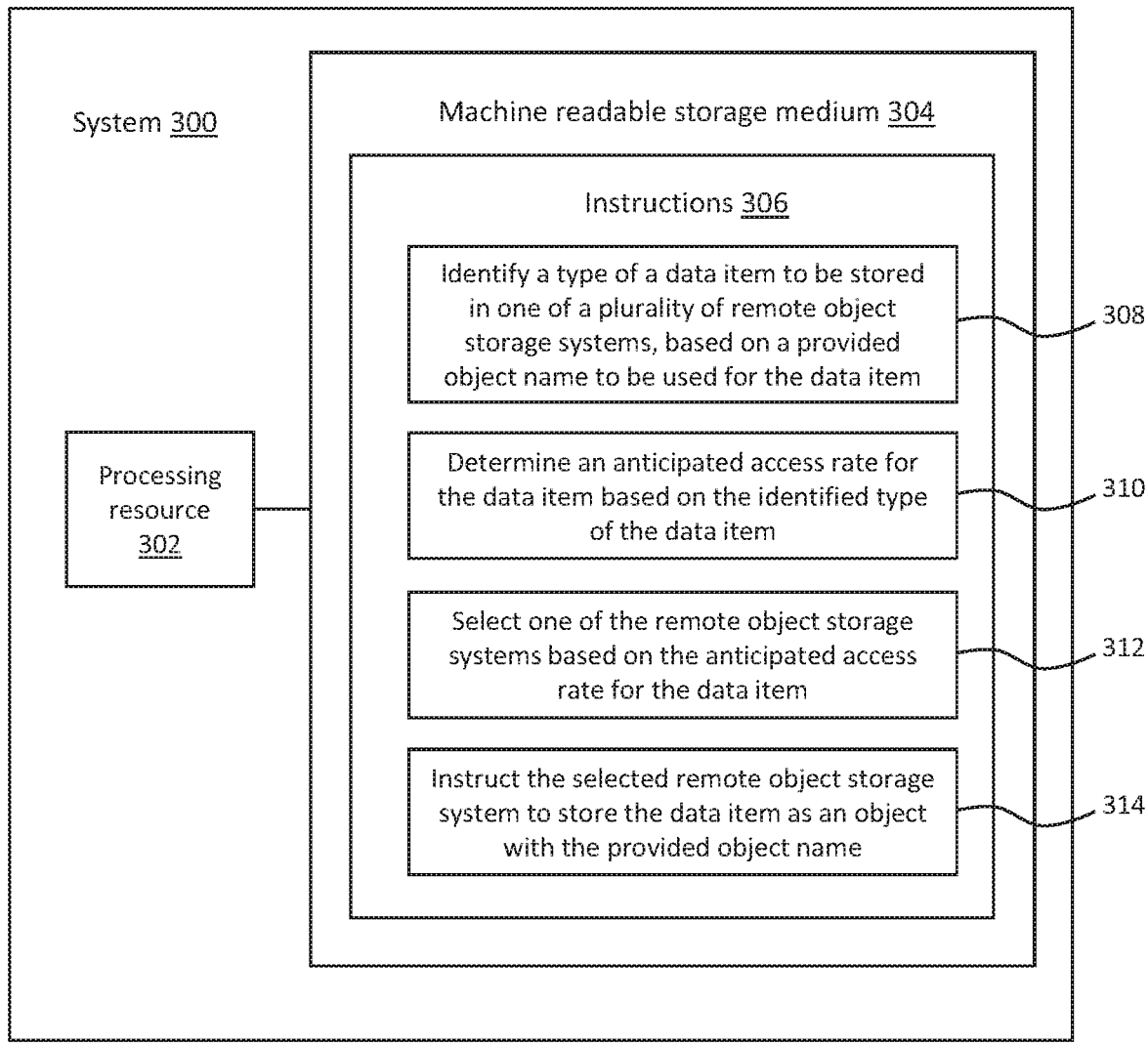
FIG. 3 is a simplified schematic of an example of apparatus to store a data item.

FIG. 3 is a simplified schematic of an example of a system 300, such as for example a system to store a data item. The system 300 comprises at least one processing resource 302, such as for example one or more processors. The system 300 also comprises a machine-readable storage medium 306 comprising instructions 308 executable by the at least one processing resource 302 to identify 308 a type of a data item to be stored in one of a plurality of remote object storage systems, based on a provided object name to be used for the data item, determine 310 an anticipated access rate for the data item based on the identified type of the data item, select 312 one of the remote object storage systems based on the anticipated access rate for the data item, and instruct 314 the selected remote object storage system to store the data item as an object with the provided object name. In some examples, the type of the data item may be whether the data item is a deduplication metadata item or a data chunk. In some examples, system 300 may be implemented by a computing device (e.g., implementing a deduplication system). In some examples, the machine-readable storage medium 304 comprises instructions 306 executable by the at least one processing resource 302 to receive the data item from a deduplication system.

In some examples, the one of the remote object storage systems is further selected based on a property of storage for the deduplication data item, and a property of data in the deduplication data item (e.g. based on the properties as well as the anticipated access rate for the data item). In some examples, the respective property of each of the remote object storage systems comprises one of a respective access throughput, access latency, access cost and storage cost of each of the remote object storage systems.

Figure 4:
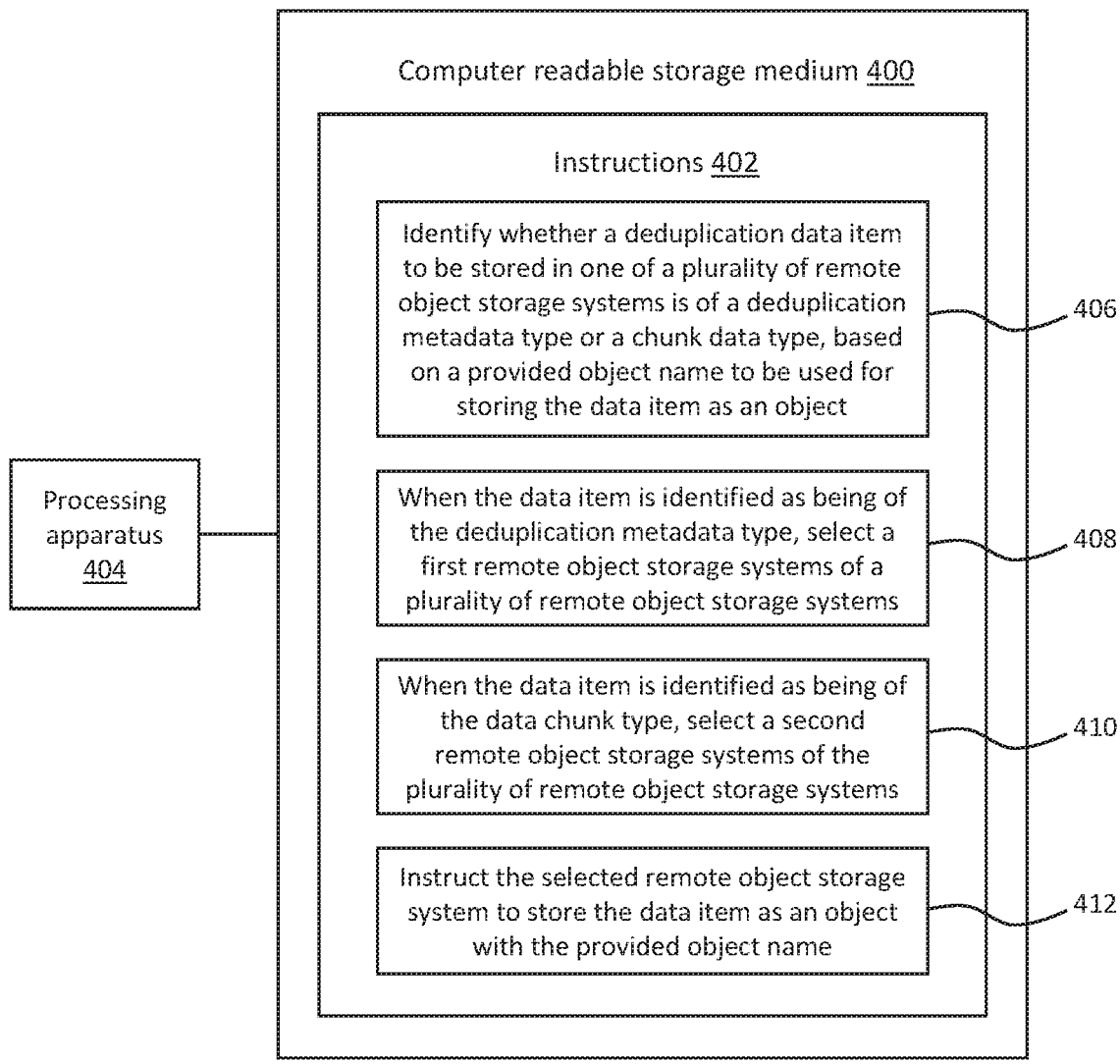
FIG. 4 is a simplified schematic of an example of a computer-readable medium.

FIG. 4 is a simplified schematic of an example of a computer-readable storage medium 400 comprising instructions 402 that, when executed by a processing apparatus 404 (e.g., of a computing device), cause the processing apparatus 404 to identify 406 whether a deduplication data item to be stored in one of a plurality of remote object storage systems is of a deduplication metadata type or a chunk data type, based on a provided object name to be used for storing the data item as an object, when the data item is identified as being of the deduplication metadata type, select 408 a first remote object storage systems of a plurality of remote object storage systems, and when the data item is identified as being of the data chunk type, select 410 a second remote object storage systems of the plurality of remote object storage systems. The instructions 402 also, when executed by a processing apparatus 404 (e.g., of a computing device), cause the processing apparatus 404 to instruct 412 the selected remote object storage system to store the data item as an object with the provided object name.

In some examples, a computing device may comprise the processing apparatus 404 and the computer-readable storage medium 400.

In some examples, the computer-readable storage medium 400 comprises instructions 402 that, when executed by the processing apparatus 404, cause the processing apparatus to determine the expected access frequency of the data item based on whether the data item is of the deduplication metadata type or the chunk data type, and to select the first or second remote object storage system based on the expected access frequency of the data item. For example, a high bandwidth or low latency remote object storage system may be selected for a deduplication metadata type of data item, and/or a low bandwidth or high latency remote object storage system may be selected for a chunk data type data item.

In some examples, the computer-readable storage medium 400 comprises instructions 402 that, when executed by the processing apparatus 404, cause the processing apparatus to select the first or second remote object storage system based further on a property of the first remote object storage system and a property of the second remote object storage system. The property may in some examples be one or more of a respective access throughput, access latency, access cost and storage cost of each of the remote object storage systems. In some examples, the type of the data item and the properties of the remote object storage systems may be used together to select an appropriate remote object storage system. For example, the type of the data item may be used to determine an expected access or usage frequency or rate of the data item after storage, and this may be used to select a remote object storage system. In some examples, a high expected access frequency may result in a remote object storage system being selected that has a lower latency, storage cost and/or access cost and/or higher throughput (e.g. bandwidth).

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors or other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims. The features of any dependent claim may be combined with the features of any of the independent claims or other dependent claims. In examples described herein, functionalities described as being performed by "instructions" may be understood as functionalities that may be performed by those instructions when executed by a processing resource. In other examples, functionalities described in relation to instructions may be implemented by one or more engines, which may be any combination of hardware and programming to implement the functionalities of the engine(s).

As used herein, a "computing device" may be a server, storage device, storage array, desktop or laptop computer, switch, router, or any other processing device or equipment including a processing resource. In examples described herein, a processing resource (or processing apparatus) may include, for example, one processor or multiple processors included in a single computing device or distributed across multiple computing devices. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), EEPROM, volatile memory, non-volatile memory, flash memory, a storage drive (e.g., a hard disk drive (HDD)), a solid state drive, any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components. In some examples, instructions may be part of an installation package that, when installed, may be executed by a processing resource to implement functionalities described herein. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A method comprising:
receiving, at a computing device from a deduplication system, a plurality of deduplication data items;
selecting a first remote object storage system to store a first one of the deduplication data items based on the first one of the deduplication data items being metadata for a deduplicated representation of a stream of data and based on respective properties of a plurality of remote object storage systems, including the first remote object storage system and a second remote object storage system;
providing a first one of the deduplication data items to the first remote object storage system for storage as an object in the first remote object storage system;
selecting the second remote object storage system, different than the first remote object storage system, to store a second one of the deduplication data items based on the second one of the deduplication data items being a collection of data chunks for a deduplicated representation of a stream of data and based on respective properties of the plurality of remote object storage systems; and
providing a second one of the deduplication data items to second first remote object storage system for storage as an object in the second remote object storage system;
wherein the respective properties of the remote object storage systems comprise at least one of respective access throughput amounts, respective access latency amounts, respective access cost amounts, or respective storage cost amounts.

2. A system comprising:
at least one processing resource; and
a non-transitory machine-readable storage medium comprising instructions executable by the at least one processing resource to:
select a first remote object storage system to store a first deduplication data item based on the first deduplication data item being metadata for a deduplicated representation of a stream of data and based on respective properties of a plurality of remote object storage systems, including the first remote object storage system and a second remote object storage system;
instruct the selected first remote object storage system to store the first deduplication data item as an object;
select the second remote object storage system, different than the first remote object storage system, to store a second deduplication data item based on the second deduplication data item being a collection of data chunks for a deduplicated representation of a stream of data and based on respective properties of a plurality of remote object storage systems; and
instruct the selected second remote object storage system to store the second deduplication data item as an object;
wherein the respective properties of the remote object storage systems comprise at least one of respective access throughput amounts, respective access latency amounts, respective access cost amounts, or respective storage cost amounts.

3. The system of claim 2, wherein the non-transitory machine-readable storage medium comprises instructions executable by the at least one processing resource to receive the a first and second deduplication data items from a deduplication system.

4. A non-transitory computer-readable storage medium comprising instructions that, when executed by a processing apparatus, cause the processing apparatus to:
identify a first deduplication data item to be stored in one of a plurality of remote object storage systems as metadata for a deduplicated representation of a stream of data;
select a first one of the remote object storage systems to store the first deduplication data item based on the first deduplication data item being metadata for a deduplicated representation of stream data and based on respective properties of the plurality of remote object storage systems, including the first one and a second one of the remote object storage systems;
instruct the selected first one of the remote object storage systems to store the first deduplication data item as an object;
identify a second deduplication data item to be stored in one of the remote object storage systems as a collection of data chunks for a deduplicated representation of a stream of data;
select the second one of the remote object storage systems, different than the first one of the remote object storage systems, to store the second deduplication data item based on the second deduplication data item being a collection of data chunks for a deduplicated representation of a stream of data and based on respective properties of the plurality of remote object storage systems; and
instruct the selected second one of the remote object storage systems to store the second deduplication data item as an object;
wherein the respective properties of the remote object storage systems comprise at least one of respective access throughput amounts, respective access latency amounts, respective access cost amounts, or respective storage cost amounts.

5. The non-transitory computer-readable storage medium of claim 4, wherein the first one of the remote object storage systems and the second one of the remote object storage systems differ in at least one of:
access throughput, access latency, access cost, or storage cost.

6. The non-transitory computer-readable storage medium of claim 4, comprising instructions executable by the at least one processing resource to:
determine that the first deduplication data item is metadata for a deduplicated representation of a stream of data based on an object name of the first deduplication data item.

7. The non-transitory computer-readable storage medium of claim 6, comprising instructions executable by the at least one processing resource to:
determine that the second deduplication data item is a collection of data chunks for a deduplicated representation of a stream of data based on an object name of the second deduplication data item.

8. The method of claim 1, wherein the first and second remote object storage systems differ in at least one of:
access throughput, access latency, access cost, or storage cost.

9. The method of claim 1, further comprising:
  determining that the first one of the deduplication data items is metadata for a deduplicated representation of a stream of data based on an object name of the first one of the deduplication data items.

10. The method of claim 9, further comprising:
  determining that the second one of the deduplication data items is a collection of data chunks for a deduplicated representation of a stream of data based on an object name of the second one of the deduplication data items.

11. The system of claim 2, wherein the first and second remote object storage systems differ in at least one of:
  access throughput, access latency, access cost, or storage cost.

12. The system of claim 2, wherein the machine-readable storage medium comprises instructions executable by the at least one processing resource to:
  determine that the first deduplication data item is metadata for a deduplicated representation of a stream of data based on an object name of the first deduplication data items.

13. The method of claim 12, wherein the machine-readable storage medium comprises instructions executable by the at least one processing resource to:
  determine that the second deduplication data item is a collection of data chunks for a deduplicated representation of a stream of data based on an object name of the second deduplication data item.

* * * * *